United States Patent [19]
Eckhardt et al.

[11] Patent Number: 5,172,709
[45] Date of Patent: Dec. 22, 1992

[54] APPARATUS AND PROCESS FOR REMOVING CONTAMINANTS FROM SOIL

[75] Inventors: Bart J. Eckhardt, Tenafly, N.J.; Brian Dengel, Chalfont, Pa.

[73] Assignee: Clean Soil Inc., Tripp Island, S.C.

[21] Appl. No.: 619,987

[22] Filed: Nov. 30, 1990

[51] Int. Cl.$^5$ ................................................ B08B 3/04
[52] U.S. Cl. .............................. 134/95.1; 134/102.1; 134/109; 134/200; 134/107; 134/108; 201/38; 210/747
[58] Field of Search ............... 202/208, 135, 134, 143; 201/35, 38; 134/107, 19, 95, 37, 102, 109, 105, 200, 108; 210/747, 180, 925; 34/78, 79, 32, 22, 27, 225, 233

[56] References Cited

U.S. PATENT DOCUMENTS

| | | | |
|---|---|---|---|
| 889,087 | 5/1908 | Asher | 201/38 X |
| 1,244,995 | 10/1917 | Loomis | 210/180 X |
| 2,127,542 | 8/1938 | Stitzer | 201/38 X |
| 2,177,665 | 10/1939 | Loughrey | 201/38 X |
| 2,680,697 | 6/1954 | Fritzsche | 134/40 |
| 2,702,433 | 2/1953 | Cohen | 34/40 |
| 3,009,863 | 11/1961 | Angevine | 202/134 X |
| 3,577,338 | 5/1971 | Gifford, II | 201/38 X |
| 3,691,648 | 9/1972 | Kraus | 34/227 |
| 3,831,294 | 8/1974 | Freze | 34/131 |
| 4,038,155 | 7/1977 | Reber | 202/170 |
| 4,409,740 | 10/1983 | Sousek | 37/79 X |
| 4,424,081 | 1/1984 | Giguere | 134/10 |
| 4,565,583 | 1/1986 | Venetta | 134/19 X |
| 4,597,776 | 7/1986 | Ullman et al. | 201/38 X |
| 4,601,115 | 7/1986 | Draper | 34/131 |
| 4,628,619 | 12/1986 | Janusch | 34/180 |
| 4,654,980 | 4/1987 | Bhat | 34/12 |
| 4,721,124 | 1/1988 | Tuerkheemer et al. | 134/138 |
| 4,755,306 | 7/1989 | Lovgren | 134/40 |

OTHER PUBLICATIONS

Cleanup of Releases From Petroleum USTS: Selected Technologies, Office of Underground Storage Tanks U.S. Environmental Protection Agency Washington, D.C. 20460.

Primary Examiner—Frankie L. Stinson

[57] ABSTRACT

An apparatus and process are described for removing contaminants from soil or other substrate materials. A hot pressurized liquid is continuously supplied to a volume of soil or other material contained in a processing vessel. The hot pressurized liquid may be steam, which vaporizes a fraction of the contaminant which is then released through a vapor filter to prevent atmospheric cross-pollution. The remaining contaminant is removed as either a liquid phase or a solid solution phase along with the steam driver. The waste stream and stream driver condense in a collector and are removed from the system. The driver may be recovered for reuse or may be discarded along with the waste stream. The processor may also be used to remove various types of contaminants ranging from light hydrocarbons, chlorinated, solvents, and water soluble organics to heavy oils, paints, heavy metals, and radionucleides.

8 Claims, 8 Drawing Sheets

APPARATUS AND PROCESS FOR REMOVING CONTAMINANTS FROM SOIL

This invention relates to a system for removing contaminants from soil. The composition of soil is extremely variable. Specifically, the physical parameters of critical characteristics of the soil matrix, such as permeability, heat coefficient, moisture content, and density vary widely depending on the soil type and condition. Moreover, soil can be contaminated with a wide variety and combination of pollutants. Strict government regulation controls the type and level of contaminants that are permitted in certain situations. For example, leaking underground storage tanks can result in the contamination of the surrounding soil by hydrocarbons from petroleum-based substances such as gasoline. Refinery and industrial sites often have high levels of soil contaminants. Contamination can also result from spills of various chemical substances along rail thruways, highways, and various other sites. Accordingly, there exists a substantial need to provide an economical and effective system to reclaim contaminated soils.

Certain systems and processes for decontaminating various types of materials are already well known. For example, decontamination systems are available for specific types of materials using specialized processes that require careful control of the temperature and processing conditions tailored to the material being decontaminated. Other systems are available that will handle a wider variety of substrate materials. These systems, however, typically require substantial capital investment and are generally large stationary units to which the contaminated soil or other substrate must physically be taken in order to be decontaminated.

Venetta, U.S. Pat. No. 4,565,583 (Jan. 21, 1986), describes a process for removing oil from metal chips. The substrate is homogenous and the physical characteristics of the substrate are fairly consistent, particularly relative to those of a non-homogenous substrate such as soil. Accordingly, critical parameters are essentially constant and reproducible. In Venetta's system, hot pressurized liquid water is passed over a bed of metal chips and expanded to partially vaporize the liquid water and reduce the density of the stream. The resulting oil-water mixture is removed from the vessel.

Giguerre, U.S. Pat. No. 4,424,081 (Jan. 3, 1984), describes a process for reconditioning soils contaminated by crude oils or other refined petroleum products. Giguerre's system comprises a large stationery mixer and kiln. The contaminated soil is removed from the site and delivered to the kiln for processing. Flotation cells wash and agitate the slurry and reagents aid in the separation of oil. The slurry is then clarified and a collecting system recovers the oil particles.

Venetta's process is tailored to the removal of specific contaminants from a specific type of substrate. The processing conditions are carefully tailored to prevent the vaporization of the oil in order to deliver a liquid oil/water mixture to the collecting section of the apparatus. Venetta's system, however, may not be able effectively to handle substrates other than metal chips. Giguerre, on the other hand, discloses a system that is capable of handling a variety of inhomogeneous materials. Yet, Giguerre's process involves the use of expensive, capital intensive equipment and is not portable. Rather, the contaminated soil must be removed and transported to Giguerre's apparatus for treatment.

In spite of the existence of the above methods, there remains a need for a low cost yet effective system for decontaminating soil, particularly with respect to smaller spills. In such circumstances removal from the site to decontaminate the soil frequently imposes excessive costs on the decontamination process. For example, leakage of hydrocarbons from an underground storage tank poses a substantial environmental threat. Yet, the volume of contaminant may be limited. In these situations, it may not be cost effective to remove and transport a limited volume of soil to a large stationery treatment facility. Moreover, physical removal and transport of contaminated soil from, and replacement with clean soil to, certain remote sites such as railroad rights of way may be constrained. Accordingly, there remains a need for a low-cost, yet effective on-site soil decontamination system. In order to make such system cost-effective for smaller volume spills, such a system must be portable. Prior approaches to decontamination of materials other than soil do not have sufficient flexibility in order to achieve effective contaiminant removal from the wide variety of soil types that are typically encountered. Existing soil decontamination systems typically impose capital or siting constraints making them infeasible for smaller volume spills. Accordingly, prior art approaches do not adequately address the problems of providing a soil decontamination system which is: effective, economical, portable, easy to use, and flexible in dealing with a variety of contaminants and soil types.

OBJECTS OF THE INVENTION

The primary object of the present invention, therefore, is to provide a soil decontamination apparatus and process that is effective and economical.

A further object of the present invention is to provide a portable soil decontamination system.

Another object of the present invention is to provide a soil decontamination system that is relatively easy to use and can be implemented in the field without substantial investment in time or resources by skilled technicians or management personnel.

It is an additional feature of the present invention to provide an apparatus and method for reclaiming soils contaminated with various types of contaminants, including but not limited to hydrocarbons, organic compounds, metals, radionucleides, etc., wherein the system is capable of separating the various contaminants from the soil.

Another feature of the present invention is to provide a method of reclaiming soils contaminated with various types of contaminants in a manner which will not cause cross-pollution to the environment.

A further feature of the present invention is to provide a method of reclaiming soils contaminated with various contaminants, while retaining substantially the composition of the soil.

Additional objects and advantages of the invention are set forth, in part, in the description which follows and, in part, will be obvious from the description or may be learned by practice of the invention. The objects and advantages of the invention will be realized in detail by means of the instrumentalities and combinations, particularly pointed out in the appended claims.

SUMMARY OF THE INVENTION

The present invention overcomes the disadvantages of the prior art and attains the objects of the invention by providing a soil reclamation system with an effective level of contaminant removal. Moreover, the invention provides for the decontamination of various soil types in a portable, economical, and easy to use system. It provides a portable apparatus that can readily be transported to the site of the contamination. Similarly, the present invention provides a compact yet flexible decontamination system that is capable of handling a wide variety of soil types and is capable of effectively removing a wide range of contaminants ranging from hydrocarbons, organics, to metals and, potentially, radionucleides.

To achieve the objects and in accordance with the purposes of the invention, as embodied and broadly described herein, the invention is a reclamation system for releasing a contaminant from a volume of material comprising a driver, processor means for containing the volume of material, said processor means further comprising driver inlet means for admitting said driver to said processor means, vapor outlet means, for removing from said processor means the vapor fraction of the contaminant at the working temperature of said processor means, and fluid outlet means for removing from said processor means said driver and the balance of the contaminant, and driver supply means for delivering a continuous stream of said driver to said driver inlet means at a temperature, volume, and pressure sufficient to remove the contaminant from the material.

It is to be understood that both the foregoing general description and the following detailed description are exemplary and explanatory only and are not restrictive of the invention as claimed. The accompanying drawings, which are incorporated herein by reference and constitute a part of the specification, illustrate certain embodiments of the invention, and together with the descriptions, serve to explain the principles of the invention.

DESCRIPTION OF THE PREFERRED EMBODIMENTS

Reference will now be made in detail to a present preferred embodiment of the invention, and several variations of a present preferred embodiment, examples of which are illustrated in the accompanying drawings.

In accordance with the invention, reclamation system 10 is adapted to decontaminate various soil types, subject to various levels and types of contamination. Three basic variations of the invention are described herein. These variations are a function of the type of waste sought to be removed from the substrate being reclaimed. First, the inventors have found that petroleum based oils, having a light to moderate viscosity and relatively low vapor pressures, can be removed using the system and method of the present invention by employing steam as the driver. Water soluble organic compounds, including but not limited to fertilizers, miscible oils, proteins, caseins, and certain acids and chlorinated solvents may also be removed in the present invention by steam.

Second, certain types of pollutants are substantially more difficult to remove from soil. For example, removal of heavy oils, residuals, asphaltines, creosote, creosole, and paints typically will not be effected under reasonable processing conditions (specifically time and temperature) by steam treatment alone. With respect to these types of pollutants, solvent injection may be employed in addition to the use of the steam driver.

Third, certain pollutants may require dissolution in order to effect removal. For example, heavy metals may require acid injection in order to dissolve and transport the metals out of the soil matrix through the waste stream.

In addition to these three variations, the soil reclamation system of the present invention can be adapted to employ various other removal strategies, including but not limited to biological removal techniques. This variation would require modification of the physical parameters of operation of the system, in particular, steam does not function in this variation as a driver but rather, controls the humidity and temperature of the processing unit and kills the microbes after they have performed their decontamination function.

It will be apparent to those skilled in the art that various modifications and variations can be made in the construction and configuration of the present invention, without departing from the scope or spirit of the invention. For example, in the embodiments mentioned above, various changes are made in certain elements of the system to accommodate the differences in removal strategies. Further, it may be appropriate to make additional modifications, depending on the substrate characteristics and the type, concentration, and condition of the contaminant. It is intended that the present invention cover the modifications and variations of the invention provided they come within the scope of the appended claims and their equivalents.

Figure 1:
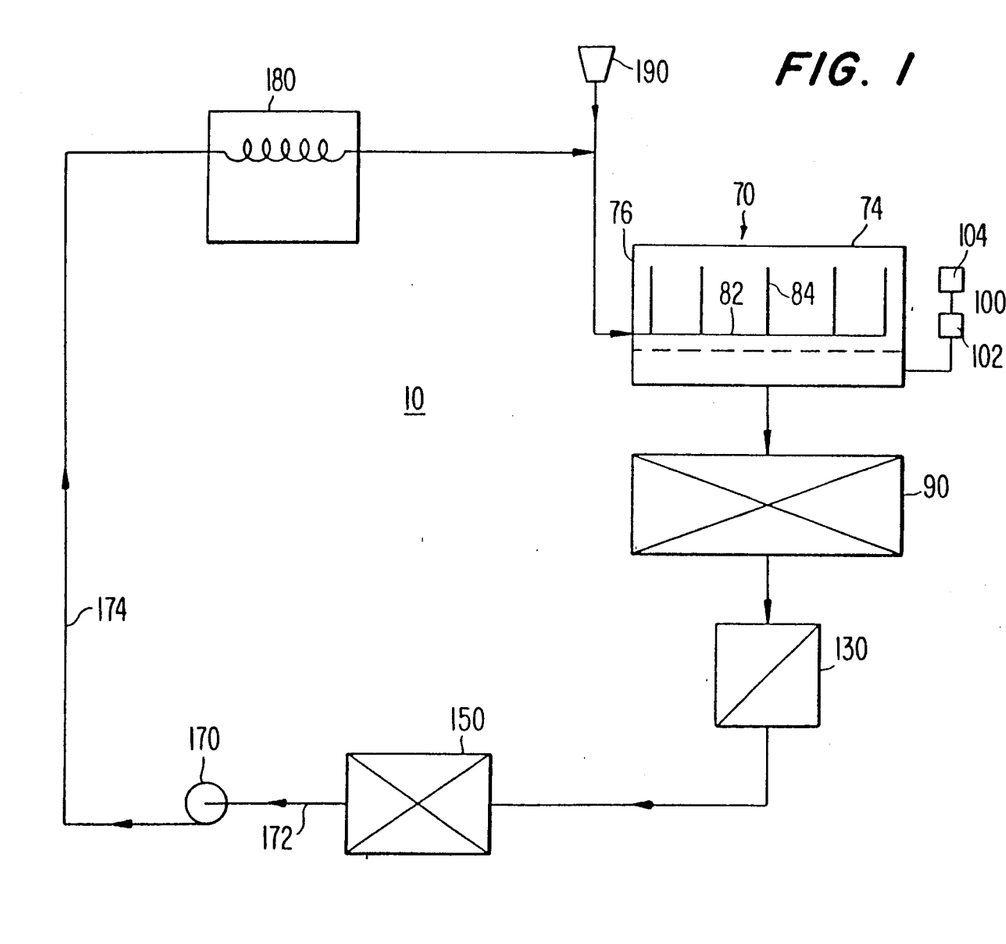
FIG. 1 is a schematic diagram of one embodiment of a soil reclamation system of the present invention using steam as a driver.

Steam Driver System for Light Hydrocarbons, Water Soluble Organics, Nucleides, and Chlorinated Solvents A preferred embodiment of the present invention in which steam is used as the driver is shown in FIG. 1 as 10. In this system, processor means 70 is a containment vessel.

In a preferred embodiment of the present invention, processor means 70 is constructed as a rectangular containment capable of withstanding the maximum operating pressure of the system. In a preferred embodiment of the present invention, process means 10 has sides 76, floor 72, and lid 74. Lid 74 is opened and processor means 70 is filled with contaminated soil 12. Processor means 70 can be filled by any convenient means (not shown) including standard construction equipment such as a front end loader. After processor means 70 has been filled with contaminated soil, lid 74 is closed and the system is made operational.

In a preferred embodiment of the invention, driver 20 is steam which is delivered to processor means 70 at a temperature of between 214° and 338° F. at a pressure of 1-100 psig. The steam is delivered to processor means by driver inlet means 80.

Figure 5:
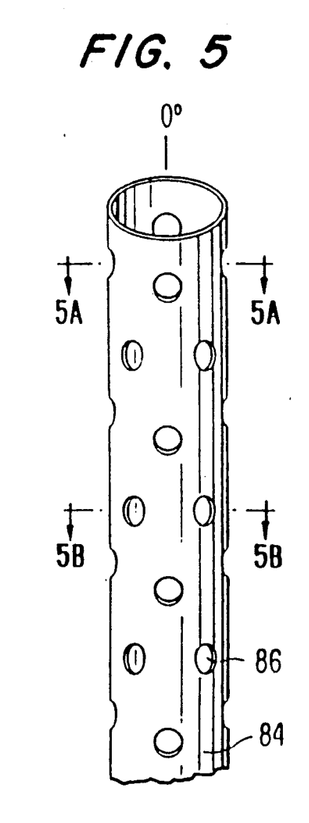
FIG. 5 is a detail schematic diagram of a portion of the system of FIG. 1 showing a driver injection means used to deliver the driver to the volume of soil.
Figure 5A:
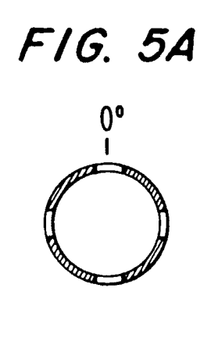
FIG. 5A is a diagram of a preferred embodiment of the driver injection means as shown in FIG. 5 along section line 5A—5A.
Figure 5B:
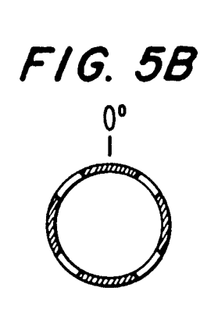
FIG. 5B is a diagram of a preferred embodiment of the driver injection means as shown in FIG. 5 along section line 5B—5B.
Figure 6:
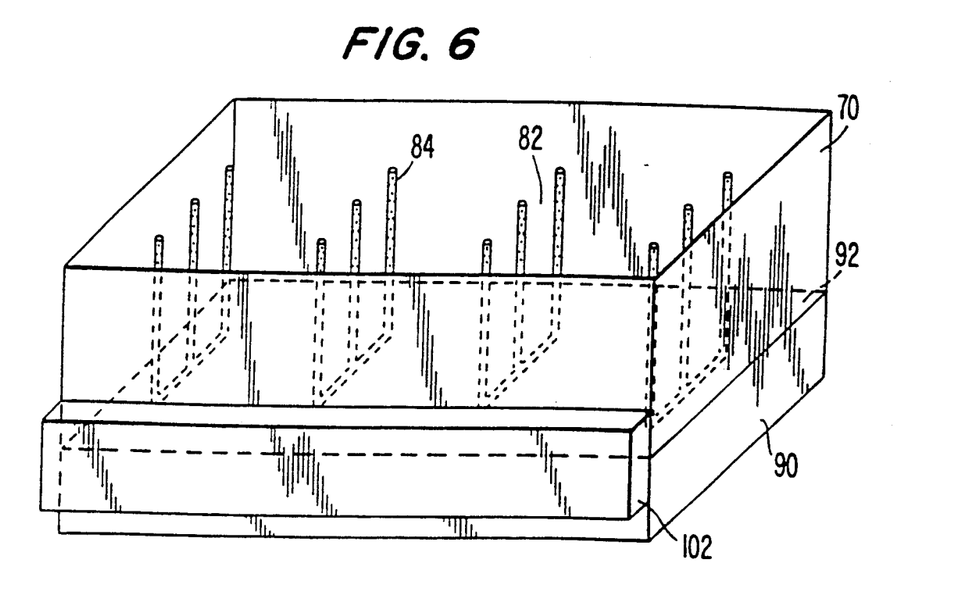
FIG. 6 is a detail schematic diagram of a portion of the system of FIG. 1 showing a processor means of the present invention.

Driver inlet means 80 has a web 82, and injector piping 84 with injector openings 86 formed therein, in order to effectively distribute driver 20 throughout the volume of soil. In a preferred embodiment of the present invention, driver inlet means 80 is disposed on one side 76 of processor means 70 substantially near the base of the soil volume 12. Web 82 extends across the base of the soil volume in processor means 70. Injector pipes 84, in turn, extend vertically from selected points on web 82 extending up into the soil matrix. Injector pipes 84 have numerous openings disposed along their axial length in order effectively to distribute the driver throughout the soil volume and to ensure wetting of the entire volume of soil 12. FIG. 6 is a detailed perspective drawing of the web 82, piping 84, and openings 86 of one preferred embodiment of the present invention.

Steam is delivered to openings 86, typically under a pressure of about 20 psig and at temperature of about 260° F. Such conditions are typically suitable for removal of light hydrocarbons, water soluble organics, nucleides and chlorinated solvents.

It will be apparent to those skilled in the art that various modifications and variations can be made in the operating temperatures and pressures of the present invention, without departing from the scope or spirit of the invention. For example, the time required to reduce the contaminant concentration to acceptable levels will typically vary as a function of the temperature and pressure of the driver, among other parameters. These three parameters can be modified depending on the operator's constraints, if any. Hence, it is intended that the present invention cover the modifications and variations of the invention provided they come within the scope of the appended claims and their equivalents.

At the beginning of the processing, soil 12 will be near ambient condition. As driver 20 is admitted to processor means 70 Soil 12 will remove heat from steam 20 being delivered through driver inlet means 80 until a temperature equilibrium is reached between soil 12 and driver 20. At the beginning of the operation, insufficient heat will be available to effect removal of the contaminant. As the processing continues, however, soil 12 and driver 20 will reach thermal equilibrium. For the above contaminants, the desired equilibrium is about 260° F. at a discharge pressure from the openings 86 of about 20 psig. The purpose of the heating is to vaporize the volatile fraction of the contaminant for removal in the vapor phase. When the soil has been heated sufficiently to induce vaporization of the contaminant, the vapor phase of the contaminant will migrate through soil 12 to vapor outlet 100.

Vapor outlet 100 has filter 102 and vapor discharge vent 104. The function of vapor outlet 100 is to prevent cross-pollution of the atmosphere as a result of volatilization of the contaminant in the reclamation system 10. To that end, filter 104 comprises an activated carbon filter 106, or other suitable filter, capable of adsorbing pollutants in the vapor phase from the vent stream before releasing the vented gases to the atmosphere.

It will be apparent to those skilled in the art that various modifications and variations can be made in the vapor outlet means 100 of the present invention, without departing from the scope or spirit of the invention. For example, if cross-pollution is not a concern, vapor outlet means 100 is optional. Various types of vapor filters can be employed as a function of the vapor being generated during operation of the reclaimer 10 of the present invention. It is intended that the present invention cover modifications and variations of the invention provided they come within the scope of the appended claims and their equivalents.

Vaporization of the contaminant occurs as the vaporization temperature(s) is/are reached after start-up through the processing run. The time required for the vaporization of the volatile fraction of the contaminant depends on a variety of factors, including the porosity of the soil, its heat capacity, the level of contamination, the type of contamination, additional solid objects contained in the soil, the temperature of processor means 70, and the time for which processor means 70 has been maintained at a temperature sufficient to vaporize the contaminant.

While the soil is sufficiently heated to induce vaporization, removal of the fluid and suspended solid portion of the contaminant will proceed as well. The driver flows through the bed of soil 12, experiencing a slight pressure drop. In a preferred embodiment of the present invention, the pressurization of processor means 70 during operation is minimal, on the order of 0 psig to 5 psig. The inventors believe that the pressure drop across the soil 12 is not the most critical parameter. Rather, the function of the driver is to heat the soil matrix and provide a means for removing and transporting the contaminant from the soil. The effectiveness of the removal of the contaminant depends on the mass flow rate of driver 20 through soil matrix 12. The pressure that is required in order to obtain this mass flow rate is a function of the porosity of the soil. The inventors have found that maintaining a substantial pressure differential across soil matrix 12 does not appear to be necessary in order to secure effective removal of the contaminant.

The driver and any liquid or solid solution phase of the material flows through interstices between the soil particles and, ultimately, migrates to the base of processor means 72. In a preferred embodiment of the present invention, floor 72 of processor means 70 is perforated baffle plate 92 which allows driver 20 and contaminant 14 to exit the soil matrix, without causing substantial back pressures to build up in processor means 70. As driver 20 and contaminant 14 migrate through soil matrix 12 to floor 72, conditions are appropriate for the condensation of steam 20. The inventors have found that with a 50 boiler horsepower driver supply means 180, generating 1477 pounds/hr saturated steam being delivered at 20 psig to the injector openings 86 and reclaiming 10 cubic yards of soil, approximately 120 gallons/hr condensate is produced.

In a preferred embodiment of the present invention, processor means 70 has collector means 90 formed below floor 72 to collect the condensate of the driver along with the fluid phase of the contaminant and any suspended contaminate solids that have been removed from soil matrix 12 during the process.

In addition, the inventors have found that the fraction of contaminant removed as a vapor phase, as opposed to the fraction as a fluid or suspended solid, depends on a variety of factors such as how much contaminant is present, the time, and how long the system has operated, and the temperature at which the system is operated. These critical parameters are derived from the application of the laws of Conservation of Energy and Conservation of Mass to a control volume. In this invention, the reclamation system of the driver supply means produces a driver which has certain properties of mass flow and energy which must be conserved in processing the control volume of material being reclaimed.

Figure 7:
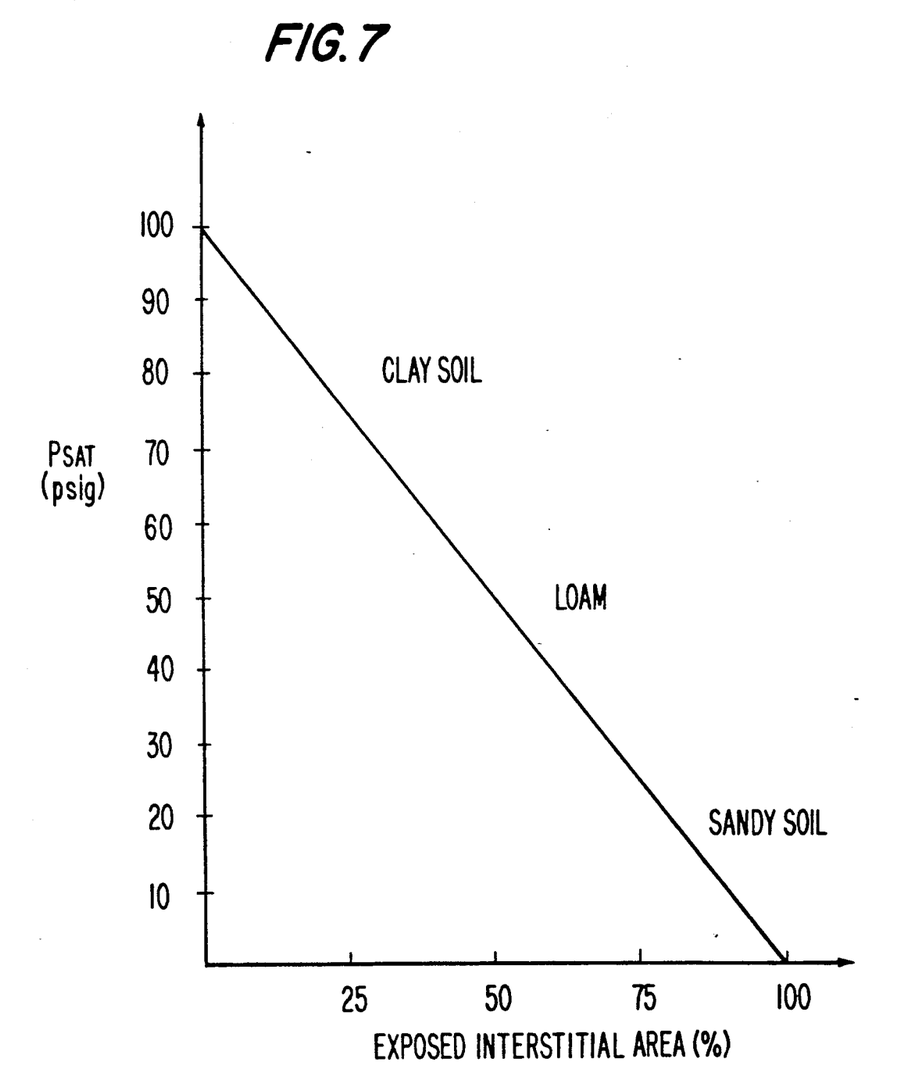
FIG. 7 is a graph of exposed interstitial flow area of a volume of soil being reclaimed relative to the steady state steam pressure of a steam injector of an embodiment of the present invention.

In the preferred embodiment, boiler 180 produces steam 20 at a particular pressure with corresponding saturation temperature. The steady state pressure of steam 20 at the injection openings 86 is established as a function of the porosity and total volume of the soil being processed, or in theory the interstitial flow area exposed to the flow of steam. See FIG. 7. The inventors have found that with a 50 boiler horsepower driver supply means 180 generating 1477 pounds per hour saturated steam to reclaim ten cubic yards of heavy clay soil. the steady state full flow pressure is 20-22 psig.

The concept of the exposed interstitial flow area is best understood through the analogy that, for a given mass flow of steam, reducing the control volume of a very densely packed soil (like clay) is the same as having a larger control volume of a very loose soil (like beach sand).

Figure 8:
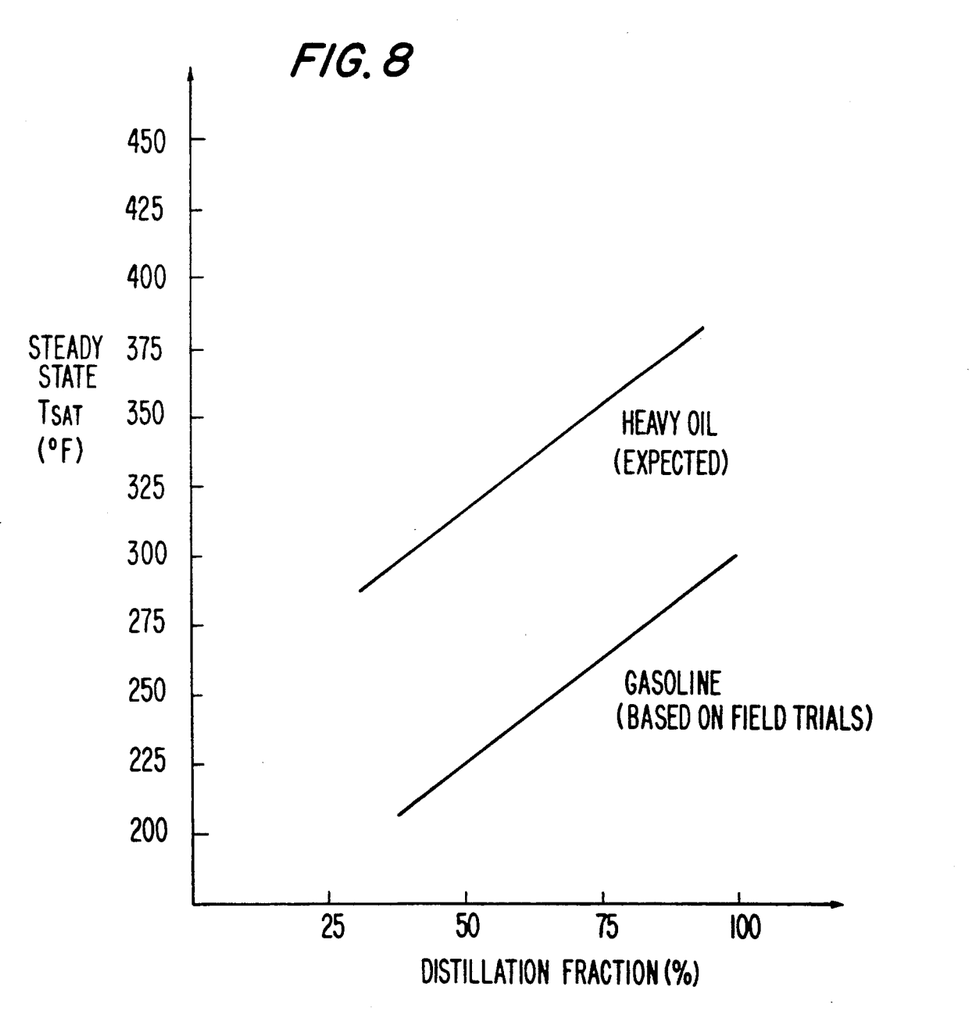
FIG. 8 is a graph of the distillation fraction for a sample volume of soil relative to temperature in the processor of an embodiment of the present invention.

At the steady state condition, the soil volume consumes energy in the following ways:
a) Heat absorbed by the soil;
b) Conversion of contaminants to vapor below the distillation point;
c) Reduction of viscosity of contaminants above the distillation point;
d) Fluid flow; and
e) Losses;
Mathematically, $E_{In}$ (the amount of energy delivered to the control volume) can be expressed as follows:

$$E_{In} = E_{Absorbed} + E_{Vapor} + E_{Contamination} + E_{Flow} + E_{Loss}$$

where b), c), and d) are the direct energy contributions to reclaiming the soil, i.e., removing contaminants, and are functions of the contaminant itself. For example, provided a system is operated above the distillation point for a given contaminant, most of the contamination is removed in the vapor phase. If only a fraction of the contaminant vaporizes at or below the operating temperature of the system, most of the contaminant is removed with the liquid phase. See FIG. 8. Solvent may be injected, not only to enhance the cleaning effect of the fluid flow of the driver (hence reducing $E_{Flow}$), but also to act as a diluent to reduce the vaporization temperature of the contaminant.

In the preferred embodiment, the boiler produces steam at full mass flow at the established steady state pressure and temperature. In the steady state condition, mass flow is realized in the control volume in the following ways:
a) Vapor flow;
b) Condensate flow;
c) Losses;
Mathematically, $$M_{In} = M_{Vapor} + M_{Condensate} + M_{Losses}$$

$M_{Losses}$ principally comprise driver absorption into the soil matrix. The air purge described elsewhere helps minimize this loss by pushing the absorbed driver out of the soil matrix. Losses a) and b) are determined by the energy absorbed by the control volume (i.e., how much of the driver condenses). See FIG. 8. Knowing the contaminant concentration, the distillation fraction, and $M_{Vapor}$ and $M_{Condensate}$, one can predict the rate at which the contaminant is removed and hence the appropriate processing time to reclaim a particular volume of soil as a function of the mass flow rate of the boiler 180.

The inventors have found that with a 50 boiler horsepower driver supply means 180 generating 1477 pounds/hour of saturated steam at 20-22 psig, the concentration of gasoline in a 10 cubic yard volume of heavy clay soil can be reduced from roughly 3000 ppm, to levels approaching 0 ppm in 1.5 hours. For example, provided the system 10 is operated at a temperature above the vaporization temperature, most of gasoline contamination is removed in the vapor phase. In contrast, operating under the same temperature conditions, the bulk of heating oil contamination would be removed in the liquid phase.

The inventors have found that processing time is a function of the fraction of the contaminant that is removed above the operating temperature as a vapor phase, the fraction removed below the operating temperature as a liquid or suspended solid phase, and the volume of material present. Moreover, the inventors have found that the extreme variability of contaminant types in soil can be readily dealt with using the reclamation system of the present invention by varying the processing time and the steady state pressure that is established. Although there is a slight pressure buildup in processor means 70 during operation, it is not necessary for processor means 70 to be pressurized to boiler pressure in order for the system to operate effectively. Nonetheless, the system could be operated at higher pressures. Effective removal has been secured even in the absence of substantial pressure differential between the top and bottom of soil matrix 12. This is accomplished through the design of multiple steam injector arms 84 combined with a multitude of openings 86 in each arm 84 at a variety of angles to ensure adequate steam distribution through the matrix. The position and number of openings will further affect the mass flow rate of drive through the system. Provided they are adequately spaced to ensure wetting of the entire soil volume, the mass flow rate desired will determine the size and number of openings 86.

In a preferred embodiment of the present invention, reclamation system 10 has first accumulator means 110. First accumulator 110 can be constructed as a tank connected to collector means 90 for receiving a mixed waste fluid stream made up of the condensate of the driver 20 and the fluid and suspended solid fractions of the contaminant. First accumulator means 110 collects the mixed waste stream and buffers the volume, pressure, and speed of fluid flow through the system to ensure steady-state operation of the processor.

Collector means, in turn, is connected to separator means 130. In a preferred embodiment of the present invention, separator means 130 can be any suitable separator including but not limited to centrifugation, microfiltration, ultra filtration, adsorption, and/or absorption filtration, systems. The separator means can employ conventional separation technology either singly or in combination. The separator prevents cross-pollution of the driver from the contaminant that has already been removed from the soil matrix 12. The waste collected in separator means 130 is then disposed, in accordance with applicable federal and local regulations.

Separator means 130 also discharges a recovered driver 26. Recovered driver 26 is delivered to second accumulator means 150. Second accumulator means similarly comprises a tank of suitable proportions configured to provide sufficient storage capacity to buffer the flow of recovered driver 26 through the system. Alternatively, recovered driver could be deliberately discharged. During operation, loss of some portion of drive 20 to the waste stream may also occur in separator means 130 even when driver 20 is recovered.

Depending on the amount of driver 20 lost in the separator means 130 and through vapor outlet 100, it may be necessary to provide makeup driver for proper operation of the system. Accordingly, in a preferred embodiment of the invention makeup driver means 160 is supplied. In practice, makeup driver means 160 can comprise a storage tank of water regulated to ensure that adequate driver is supplied to second accumulator 150 for steady state operation of the system.

Driver supply means has second accumulator means 150, driver makeup means 160, and generator 180. Pump 170 can be provided in supply line 172 to draw any required driver for operation of processor means 70. Pump 170 discharges a liquid stream through supply line 174 to steam generator 180. In the preferred embodiment of the present invention, steam generator 180 can be a conventional oil fired fire-tube boiler. The use of standard, off-the-shelf equipment substantially reduces the cost of operation of the system and the ease with which it can be employed, repaired and/or modified in the field.

Nonetheless, it will be apparent to those skilled in the art that various modifications and variations can be made in the construction of driver supply means 170 without departing from the scope or spirit of the invention. For example, steam generator 180 could be any suitable system for adding heat to driver 20 in order to effect a pressure and corresponding temperature increase sufficient to remove the contaminant. In addition, rather than recycling recovered driver 26, the used driver could be discarded with the waste stream and all of the driver could be supplied through the makeup system. Moreover, depending on the pressure at which the supply water is provided, pump 170 may not be necessary in order effectively to supply processor means 70. Hence, it is intended that the present invention cover the modifications and variations of the invention provided they come within the scope of the appended claims and their equivalents.

After it has been heated to a sufficient temperature for operation of processor means 70, driver 20 is delivered by driver supply means 170 to driver inlet means 80 to continue the operation of the system. After the contaminant has been removed from the soil, driver supply means 170 is turned off and the driver and mixed waste stream is allowed to drain out of processor means 70.

At this point, the soil is extremely hot. Depending on the porosity, density, and other characteristics of soil matrix 12, and on the equilibrium temperature of soil matrix 12, the soil and processor means 70 may retain substantial heat for an extended period of time, thereby introducing the possibility of cross-pollution to atmosphere as the hot soil continues to generate volatile compounds after the processing has stopped. Although it is not required, compressor 190 is provided to accelerate the cooling time. Compressor 190 delivers fresh air, or other suitable gas(es), through a purge valve 200 to processor means 70. The air delivered by purge valve 200 flows through the soil matrix 12 and processor means 70 and out vapor outlet 100, thereby substantially reducing the retained heat in soil matrix 12.

The reclaimed, cooled soil 12 is then removed from processor means 70 by any suitable means, not shown. For example, processor means 70 can be outfitted in a cradle 78 so that processor means 70 can be tipped to discharge the reclaimed soil 12. The reclaimed soil can then be used for any acceptable purpose, consistent with the residual level of contamination, if any.

It will be apparent to those skilled in the art that various modifications and variations can be made in driver 20, vapor outlet 100, processor means 70, collector 90, separator means 130, and driver supply means 170 without departing from the scope or spirit of the present invention. For example: collector 90 could either be integral with, or separate from, first accumulator means 120; second accumulator means 150, pump 170, generator 180, compressor 190, and air purge 100, although valuable enhancements to the reclamation system of the present invention, are not essential to its operation. Hence, it is intended that the present invention cover the modifications and variations of the invention provided they come within the scope of the appended claims and their equivalents.

Solvent Injection

Figure 2:
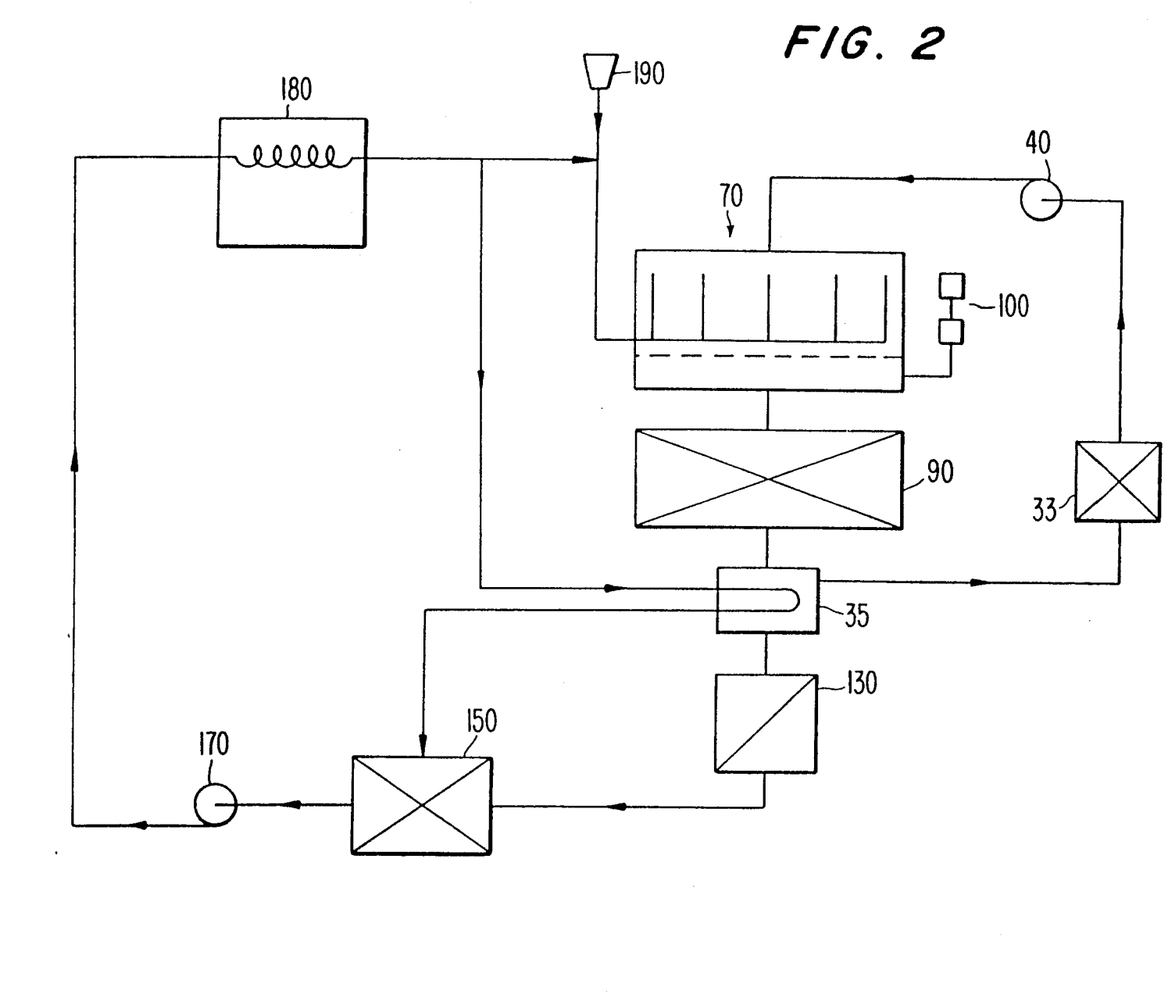
FIG. 2 is a schematic diagram of a second embodiment of a reclamation system of the present invention using a solvent in addition to the steam driver.

Among the variations in the preferred embodiment of the present invention that may be appropriate in order to remove certain types of pollutants is solvent injection. Pressurized solvent can be delivered by atomized spray at approximately 10 psig above the driver pressure. The solvent system has the same basic configuration as the reclamation system employing steam as a driver, with certain variations. First, the solvent system is supplied with a solvent delivery 30 and solvent recovery 35 systems. Pressurized solvent 32 is injected into processor means 70 through solvent supply piping 42. Atomized spray of solvent 32 is delivered to driver inlet means 80 in driver inlet piping 81. Accordingly, solvent 32 is delivered to the soil matrix along with driver 20 and permeates the soil matrix to help volatilize and transport difficult to remove contaminants. Solvent injection may be appropriate with contaminants such as heavy oils (having moderate to heavy viscosities and high vapor pressures) residuals and asphaltines, creosote and creosole, and paints.

The solvent injection reclamation system works in much the same way as the basic steam driver system. Specifically, the solvent assists in freeing the contaminant from the soil particles, and lowers the viscosity of the contaminant, allowing the vapor fraction of the contaminant to migrate through soil matrix 12 to vapor outlet means 100. The liquid fraction and fraction of the contaminant carried as a solid solution migrate downwards through the soil matrix with driver 20 through floor 72 to collector means 90. In the same way that the contaminant and driver streams are recovered as a mixed waste stream in the steam driven version of the invention, the solvent and driver along with the liquid phase and suspended solid phase of the contaminant are delivered to collector 90 in the solvent version.

Solvent recovery is effected in a solvent recovery tank. Prior to being separated, the mixed waste stream is delivered to solvent recovery tank 34. Evaporator line 36 from driver supply means 170 passes through solvent recovery tank 34 to hold the mixed waste stream and evaporate the solvent. In a preferred embodiment of the invention, the evaporated solvent is separated from the mixed waste stream prior to separation of the contaminant from the recovered driver.

The evaporated solvent is then condensed and recovered. The recovered solvent is delivered to solvent tank 33. Solvent tank 33 acts as an accumulator to buffer the flow of solvent through the system to ensure a steady supply of solvent to processor means 70. In addition, some of the solvent may be lost in processing and may remain mixed with the driver or may be discarded with the waste stream in a separator step. Accordingly, solvent makeup means 39 is supplied to maintain a constant level of solvent in solvent recovery tank 34. Solvent feed line 37 supplies solvent from solvent recovery tank 34 to solvent pump 40. Solvent pump 40, in turn, maintains the necessary pressure in solvent supply line 42 to ensure delivery of pressurized solvent to driver input means 80, in order to effect reclamation of the soil.

It will be apparent to those skilled in the art that various modifications and variations can be made in solvent recovery system of the invention without departing from the scope or spirit of the invention. For example, solvent 30 can be any effective solvent for removing the contaminant which has a vapor pressure sufficient that it can be recovered. Alternatively, solvent recovery is not a necessary step of the process and fresh solvent could be supplied continually, allowing the used solvent to be discarded with the waste stream. Hence, it is intended that the present invention cover the modifications and variations of the invention, provided they come within the scope of the appended claims and their equivalents.

Acid Injection

Figure 3:
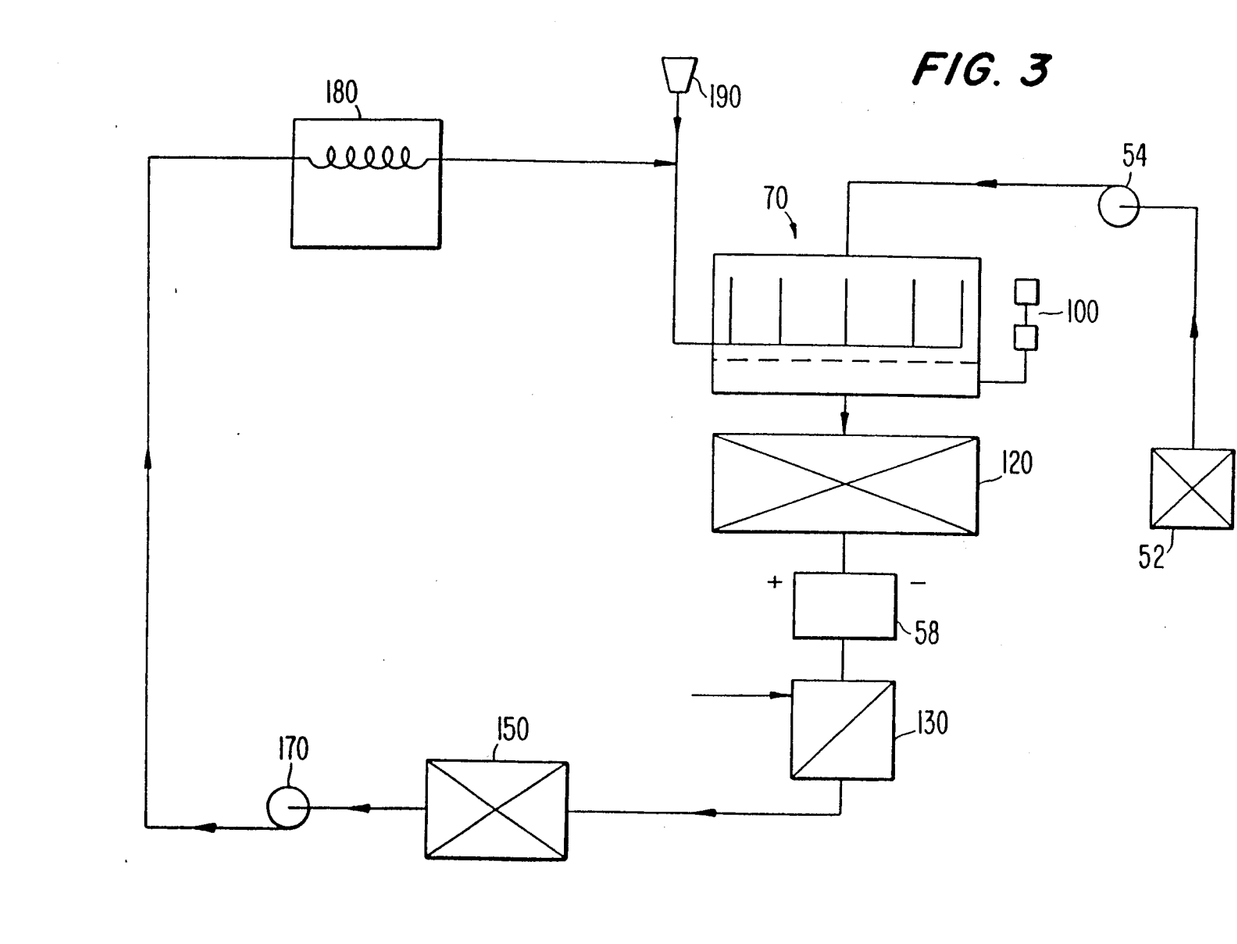
FIG. 3 is a schematic diagram of a third embodiment of a soil reclamation system of the present invention using an acid in addition to the steam driver, specifically designed to remove metal particles from the soil.

Alternatively, driver 20 of the present invention can be further modified to facilitate removal of metal through the injection of a suitable acid. Heavy metals typically require acid injection. Heavy metal contamination is common in a variety of industrial setting, including mills and foundries.

The acid injection variation of the present invention is similar in some respects to the solvent injection variation, outlined above. Pressurized acid is delivered in the form of an atomized spray to driver inlet means 80 at approximately 10 psig above the steam pressure. Acid system 50 includes acid tank 52 for storing acid prior to pressurization and delivery to processor means 70. Acid is delivered from acid tank 52 by acid piping 53 to acid pump 54. Acid pump 54 is constructed of suitable material to resist corrosion. Its construction will depend upon the characteristics of the particular acid being employed, which in turn is a function of the metal(s) desired to be removed.

Acid injection piping 56 delivers acid from acid injection pump 54 to driver supply means 80. As was the case with respect to solvent injection, acid is delivered to the soil matrix through driver supply means 80 where it permeates the soil matrix 12. Unlike contamination with hydrocarbons, organic and other compounds, however, virtually none of the metal will be removed as a vapor phase. Rather, the contaminant will migrate through the soil matrix as a fluid and a suspended solid until it reaches floor 72 of processor means 70. The mixed waste stream will comprise used driver, acid, and contaminant.

In contrast to the solvent injection system, acid is not recycled in a preferred embodiment of the present invention. Rather, the mixed waste stream 26 is delivered to first accumulator means 120. Deionization tank 58 is connected to first accumulator means 120. In this tank, an electric charge is supplied to the mixed waste fluid in order to remove heavy metal ions from the mixed waste stream. The ions are then discharged from the system in accordance with appropriate environmental laws and regulations. The resulting mixed waste fluid is next delivered to separator means 130, which includes a neutralization step. In separator means 130, the acid is neutralized through the addition of an appropriate base. The contaminant and resulting ester are removed as a waste stream. The recovered driver 26 is then delivered to second accumulator means 150, as in the basic invention using steam only as the driver.

It will be apparent to those skilled in the art that modifications and variations can be made in the acid injection system 50 of the present invention without departing from the scope or spirit of the invention. For example, acid pump 55 is not necessary and acid 51 could be delivered from acid tank 52 through a gravity feed system. Alternatively, rather than being injected into driver supply means 80, acid could be supplied directly to the soil matrix through acid supply piping 56. Hence, it is intended that the present invention cover the modifications and variations of the invention, provided they come within the scope of the appended claims and their equivalents.

Biological Removal

Figure 4:
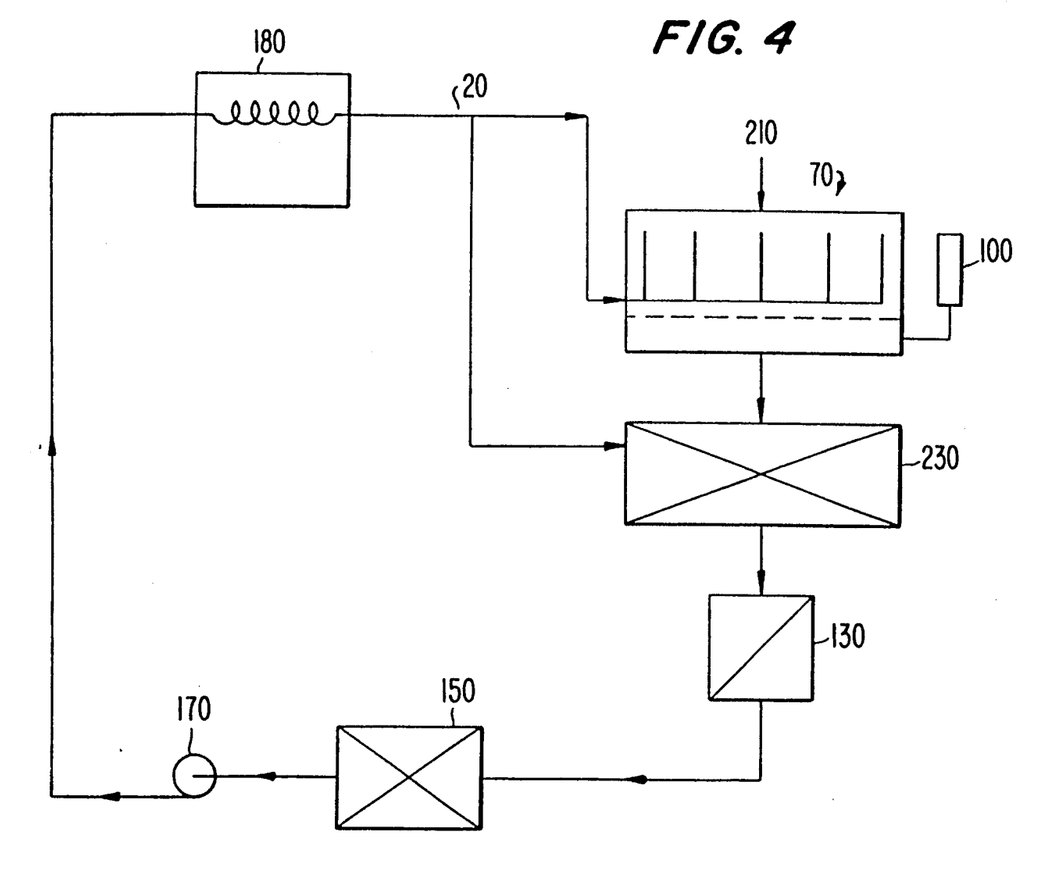
FIG. 4 is a schematic diagram of another preferred embodiment of the present invention employing biological remediation techniques, in lieu of a chemical or physical driver, and wherein the steam driver is used to maintain appropriate temperature and humidity conditions in the processor tank and to kill the microbes after they have performed their decontamination function.

In addition, removal of contaminants from soil may also be effected by biological agents such as microbes. In contrast to the solvent injection and acid injection variations outlined above, the biological variation of the preferred embodiment of the present invention involves substantial differences in the manner in which the driver operates. Microbes 210 are supplied to processor means 70 by any appropriate means.

In contrast to the preferred embodiment of the present invention outlined above, the biological version of a preferred embodiment does not involve the use of steam as a driver. Rather, steam is used to control the humidity and temperature of the soil matrix 12 in processor means 70, in order to encourage optimal growth of the microbes. In addition, driver 20 is used in a kill tank 230 to kill off any remaining microbes that have survived in the waste stream. In this way, the long-term environmental effects of the use of a microbal decontamination system can be reduced or eliminated.

Microbes could be added to soil matrix 12 as processor means 70 is loaded. Alternatively, appropriate bacteria or microbes could be delivered to the top of the soil matrix 12 through microbe supply piping 220. The humidity and temperature of soil matrix 12 is controlled by driver inlet means 80 to provide an optimal environment for the growth and development of the microbes 220. Microbes 220 then proceed to digest the contaminant and migrate downward through the soil matrix 12 to floor 72. In a preferred embodiment of the invention, microbes 220 and condensate accumulate in collector means 90 and are delivered to kill tank 230. Kill tank 230 is supplied with driver 20 through steam piping 235 from steam generator 180. Driver supply means 170 provides steam at sufficient temperature and pressure to kill the remaining microbes surviving in kill tank 230. The resulting effluent stream is made up of recovered driver 26, dead microbes 220, and fluid and solid solution phases of the contaminant. Steam 20 is delivered to kill tank 230 from steam supply piping 235 at temperatures of roughly 230° F. to 250° F., and at pressures from roughly 6 psig to 15 psig. The temperature and pressure of steam supplies to the kill tank can be adjusted to ensure an effective kill of the microbes to ensure that viable microbes are not released with the waste stream.

The mixed effluent of the process is then delivered from kill tank 230 to separator means 130 where the recovered driver 26 is removed from the mixed waste stream and the balance of the mixed waste stream is discharged in accordance with applicable environmental regulations.

It will be apparent to those skilled in the art that various modifications and variations can be made in the microbe decontamination system of the present invention, as well as each of the variations outlined above, without departing from the scope or spirit of the invention. Hence, it is intended that the present invention cover the various modifications and variations of the invention, provided they come within the scope of the appended claims and their equivalents.

EXAMPLE 1

Site of an old iron foundry contained more than 1,000 cubic yards of soil to be reclaimed. Soil contained substantial amounts of cinder and iron slag presumably from former foundry operations. Contamination tested at approximately 50,000 to 75,000 ppm TPH, presumably from quenching oils used in foundry operations and fuel oils used to fire furnaces. First batch processed for 1 to 2 hours at partial flow of 40 psig. Upon dumping some dry pockets, reflecting inadequate steam penetration, were detected. Pattern of steam distribution was found to be non-uniform. Pattern in steam injector means was modified so that rows of holes were drilled in successive rotational increments of 45°. Subsequent batch was loaded and processed for two hours at partial flow first of 40 psig then 70 psig. Upon dumping, the volume of soil was fully wetted. Condensate produced from operation of the system was approximately 150 gallons of condensate with visible oil sheen.

EXAMPLE 2

Approximately 100 to 150 cubic yards of soil were contaminated by gasoline leaking from underground storage tanks. Three tanks, approximately 2,000 gallons each, were removed. The contaminated soil was removed and placed on a plastic tarp and covered with plastic to prevent cross-pollution. The soil was tested and found to contain approximately 750 to 1,000 mg/kg of TPH. Additional batches were processed at 1.25 to 1.5 hours at full boiler flow with steady state pressure of 20-22 psig. Random samples were taken for lab testing. Samples were certified ranging from 0 TPH to 119 TPH.

We claim:

1. A reclamation system for removing a contaminant from a volume of soil, comprising:
   driver means for transporting the contaminant from the volume of material,
   processor means for containing the volume of material, said processor means further comprising
   driver inlet means for admitting said driver to said processor means,
   vapor outlet means, for removing from said processor means the vapor fraction of the contaminant at the working temperature of the reclamation system, and
   fluid outlet means for removing from the volume of material that fraction of said driver that has condensed and the balance of the contaminant that is removed from the volume of material, less the vapor fraction of the contaminant;
   collector means in communication with said fluid outlet means for collecting the driver condensate and the balance of the contaminant that is removed from the volume of material, less the vapor fraction, and discharging the resulting mixed fluid stream from said processing means;
   first accumulator means in communication with said collector means for accumulating the driver and fluid fractions of the contaminant removed from the volume of soil;
   separator means in communication with said collector means for separating the fluid and solid fractions of the contaminant from said driver into a waste discharge stream and a recovered driver fluid stream;
   driver supply means in communication with said separator means for delivering said recovered driver fluid stream to said driver inlet means at a temperature, volume, and speed sufficient to effect removal of the contaminant from the soil;
   driver make up means, in communication with said driver supply means, for supplying additional driver needed to maintain the operating conditions of said processor means;
   heating means, cooperating with said driver supply means to heat said driver to temperatures necessary to effectuate removal of said contaminant from the volume of material;
   air purge means, for injecting air into said processor means after processing has been completed in order to purge said processor means of contaminant vapor and to cool the reclaimed volume of material; and
   wherein said reclamation system is portable.

2. The reclamation system of claim 1, wherein said driver is steam.

3. The reclamation system of claim 1, wherein said system further comprises solvent means, said solvent means being admitted to said processor to aid the driver in the removal of the contaminant from the volume of material.

4. The reclamation system of claim 1, wherein said system further comprises acid means, said acid means being admitted to said processor to aid the driver in the removal of the contaminant from the volume of material.

5. The reclamation system of claim 1, wherein said system further comprises base means, said base means being admitted to said processor to aid the driver in the removal of the contaminant from the volume of material.

6. The reclamation system of claim 1, wherein said system further comprises driver recovery means for separating said driver from said contaminant in the waste stream exiting said processor through said fluid outlet means.

7. The reclamation system of claim 1, wherein said driver inlet means delivers said driver to the volume of material through a series of perforated pipes.

8. The reclamation system of claim 1, wherein said system further comprises a filter connected to said vapor outlet means to reduce the amount of the vapor fraction of the contaminant released from said vapor outlet means.

* * * * *